(12) United States Patent
Tatemoto et al.

(10) Patent No.: US 7,482,415 B2
(45) Date of Patent: Jan. 27, 2009

(54) PROCESS FOR PRODUCING FLUOROIONOMER, METHOD FOR PURIFICATION AND CONCENTRATION OF THE IONOMER, AND METHOD OF FILM FORMATION

(75) Inventors: Masayoshi Tatemoto, Takatsuki (JP); Tadashi Ino, Settsu (JP); Kenji Ishii, Settsu (JP); Takuji Ishikawa, Settsu (JP); Takuya Arase, Settsu (JP)

(73) Assignee: Daikin Industries, Ltd., Osaka-Shi (JP)

( * ) Notice: Subject to any disclaimer, the term of this patent is extended or adjusted under 35 U.S.C. 154(b) by 162 days.

(21) Appl. No.: 10/182,737

(22) PCT Filed: Feb. 16, 2001

(86) PCT No.: PCT/JP01/01128

§ 371 (c)(1),
(2), (4) Date: Aug. 14, 2002

(87) PCT Pub. No.: WO01/60876

PCT Pub. Date: Aug. 23, 2001

(65) Prior Publication Data

US 2003/0023015 A1 Jan. 30, 2003

(30) Foreign Application Priority Data

Feb. 16, 2000 (JP) .............................. 2000-038704
Feb. 16, 2000 (JP) .............................. 2000-038709
Mar. 24, 2000 (JP) .............................. 2000-084912

(51) Int. Cl.
*C08F 30/04* (2006.01)

(52) U.S. Cl. ...................... 526/240; 526/243; 526/247; 526/255; 526/286

(58) Field of Classification Search .............. 526/243, 526/247, 255, 240, 286
See application file for complete search history.

(56) References Cited

U.S. PATENT DOCUMENTS

| 5,718,947 | A | | 2/1998 | Martin et al. | ............... 427/243 |
| 6,025,092 | A | * | 2/2000 | Doyle et al. | ................ 429/213 |

FOREIGN PATENT DOCUMENTS

| EP | 0235998 | | 9/1987 |
| EP | 1 026 152 | * | 9/2000 |
| EP | 1 026 152 A1 | | 9/2000 |
| EP | 1 091 435 A1 | | 11/2001 |
| JP | 62-288615 | | 12/1987 |
| JP | 06-016856 | | 1/1994 |
| JP | 11-040162 | | 2/1999 |
| JP | 11-130743 | | 5/1999 |
| JP | 11-329062 | | 11/1999 |
| JP | 2000-327809 | | 11/2000 |
| WO | WO98/43952 | | 10/1998 |
| WO | WO00/52060 | | 9/2000 |
| WO | WO 00/07705 A2 | * | 12/2000 |
| WO | WO00/77057 | | 12/2000 |

* cited by examiner

*Primary Examiner*—Robert D. Harlan
(74) *Attorney, Agent, or Firm*—Kratz, Quintos & Hanson, LLP (57) ABSTRACT

The present invention provides a process for producing a fluorinated ionomer, comprising copolymerizing, in the presence of a polymerization initiator, (i) a compound represented by Formula (I)

$$(M)_{1/L}OSO_2CFY(CF_2)_mO(CFXCF_2O)_nCF=CF_2 \quad (I)$$

wherein M is H or a metal with a valence of L (L is 1, 2 or 3), X is F, Cl or $CF_3$, Y is halogen, m is 1 to 5, and n is 0 to 5, (ii) tetrafluoroethylene and (iii) at least one third monomer selected from the group consisting of hexafluoropropylene, chlorotrifluoroethylene, vinylidene fluoride, $CF_2=CFORf$ (Rf is $C_1$ to $C_5$ perfluoroalkyl) and ethylene.

The present invention further provides a method for purifying and concentrating a fluorinated ionomer, comprising ultrafiltration or dialysis of a fluorinated ionomer solution or dispersion, and a method for forming a film of the fluorinated ionomer.

17 Claims, 1 Drawing Sheet

PROCESS FOR PRODUCING FLUOROIONOMER, METHOD FOR PURIFICATION AND CONCENTRATION OF THE IONOMER, AND METHOD OF FILM FORMATION

TECHNICAL FIELD

The present invention relates to a process for producing a sulfonic acid group-containing fluorinated ionomer; a method for purification and concentration of a fluorinated ionomer and a method for forming a film of a fluorinated ionomer; and a process for producing a sulfonic acid functional group-containing fluorinated ionomer, more specifically, a process for producing a fluorinated ionomer for ion-exchange membranes.

BACKGROUND ART

Known fluorinated ionomers include copolymers in which sulfonic acid groups or carboxyl groups are bonded to a perfluorinated polymer chain, such as Nafion (trademark), Flemion (trademark), etc. These fluorinated ionomers have been developed as ion-exchange membranes mainly used for brine electrolysis. Researchers are studying their uses as chemical sensors, separation membranes, polymeric superacid catalysts and proton-conducting polyelectrolytes for fuel cells, among others.

Generally, these copolymers are produced by an emulsion polymerization process comprising copolymerizing a sulfonyl fluoride ($SO_2F$) group-containing monomer with tetrafluoroethylene in water containing a surfactant (Japanese Unexamined Patent Publication No. 1987-288614, etc.); a solution polymerization process carried out in a solvent compatible with sulfonyl fluoride group-containing monomers; a suspension polymerization process carried out in a dispersion of the solvent in water, or like process. The polymerization medium used in these polymerization processes is an organic solvent compatible with sulfonyl fluoride group-containing monomers, generally a fluorine-containing solvent. For example, Japanese Unexamined Patent Publication No. 1994-199958 proposes a technique using a hydrofluorocarbon, and Japanese Unexamined Patent Publication No. 1994-19959 proposes a technique using a hetero atom-containing perfluorocarbon.

Another process proposed for producing a copolymer having sulfonate functional groups bonded to a perfluoropolymer chain is a technique using a monomer containing sulfonate functional groups ($SO_3M$; wherein M is an alkali metal). For example, U.S. Pat. No. 3,560,568 states that a white solid copolymer was obtained by ordinary emulsion copolymerization of $CF_2$=CF—O—$CF_2CF_2$—$SO_3Na$ with tetrafluoroethylene in water containing a surfactant dissolved therein.

However, the present inventors' investigation showed that, when a sulfonate functional group-containing vinyl ether monomer was copolymerized with tetrafluoroethylene in water, the amount of the vinyl ether monomer introduced was extremely small (not more than 1 mole %), and the obtained polymer was mostly a homopolymer of tetrafluoroethylene (PTFE). This is presumably because the sulfonate functional group-containing vinyl ether monomer is water-soluble whereas tetrafluoroethylene is hardly water-soluble, so that it is difficult for the vinyl ether monomer and tetrafluoroethylene to coexist in the place of polymerization (in this case, the vicinity of a micelle formed by the surfactant).

Further, WO98/43952, pamphlet, discloses that another process called an iodine-transfer polymerization process gives a copolymer of a monomer represented by Formula (1')

wherein M is an alkali metal or an alkaline earth metal, and n is 0, 1 or 2, with another monomer. This process is capable of producing a copolymer to which the monomer of Formula (1') has been introduced at a desired ratio.

However, the process has the problems that it involves relatively complicated manipulation and necessitates the use of an expensive iodine compound.

Moreover, in the case where tetrafluoroethylene is used as the other monomer, the obtained aqueous dispersion of the copolymer is instable especially when the amount of the monomer of Formula (1') is relatively small. In particular when synthesized in a large amount, the obtained copolymer is difficult to purify.

A polymer is purified generally by freezing a polymer dispersion or adding an electrolyte or an acid to the polymer dispersion to coagulate and separate the polymer, followed by washing, extraction or like procedure.

However, fluorinated ionomers, especially those containing sulfonate groups, are stable as solutions or dispersions, and thus are difficult to purify by the known method.

Further, a film of a fluorinated ionomer can be formed by casting, but the film may crack during drying, depending on such factors as the type of material, the film thickness, etc.

An object of the present invention is to provide a process for producing a fluorinated ionomer that can be easily purified.

Another object of the invention is to provide a method for purifying and concentrating a fluorinated ionomer, and a method for forming a film free of cracking.

Another object of the present invention is to provide an industrially easy process for producing a fluorinated ionomer having sulfonic acid functional groups bonded to a perfluoropolymer chain, using a sulfonic acid functional group-containing perhalogenated monomer.

DISCLOSURE OF THE INVENTION

The present inventors carried out intensive research in view of the above objects. As a result, the inventors found that when copolymerization is carried out using a third monomer in addition to the monomer of Formula (I) and tetrafluoroethylene, the resulting aqueous dispersion of an ionomer has improved stability, and the ternary or higher ionomer obtained can be easily purified by removing low-molecular-weight ionic impurities such as residual monomers through ultrafiltration, dialysis or like method.

The present inventors carried out further investigation in view of the above objects, and found the following. Fluorinated ionomers are difficult to purify by freezing or addition of an electrolyte or an acid for coagulation and separation of polymers followed by washing, extraction or like procedure. However, this coagulation resistance (stability) can be utilized to perform ultrafiltration or dialysis, so that unreacted monomers, the polymerization initiator and its decomposition products, and other low-molecular-weight impurities can be easily collected and removed, and the purified fluorinated ionomers can be concentrated.

The inventors further found that the obtained concentrate can be formed into a film by casting, and that, in the film formation by casting, use of a cation affinity substance as a film-forming aid suppresses cracking even when a thick film is formed.

As mentioned above, since sulfonyl fluoride group (SO2F group)-containing monomers used in known techniques are lipophilic and thus can exist in the vicinity of a micelle formed by a surfactant, they are capable of undergoing emulsion polymerization. On the other hand, sulfonate functional group ($SO_3M$ group)-containing vinyl ether monomers are water-soluble, and therefore difficult to copolymerize with tetrafluoro-ethylene by a conventional emulsion polymerization process.

Conventional solution polymerization processes and suspension polymerization processes for obtaining copolymers of a fluorine-containing vinyl ether monomer with tetrafluoroethylene or the like are carried out using fluorine-containing organic solvents such as chlorofluorocarbon, hydrochlorofluorocarbon, hydrofluorocarbon, etc. However, the sulfonic acid functional group-containing vinyl ether monomer for use in the invention is insoluble in these solvents. Therefore, the known techniques are difficult to apply.

A process is known which produces a copolymer of a non-fluorine vinyl ether monomer with tetrafluoro-ethylene or the like using, as a medium, a non-fluorine organic solvent such as t-butanol (for example, Japanese Unexamined Patent Publication No. 1999-16604). However, when a fluorine-containing vinyl ether is used in this process, a hydrofluorocarbon (Asahiklin AK-225cb, trademark) is employed as a polymerization medium.

The present inventors found that sulfonic acid functional group-containing perhalogenated monomers are soluble in specific solvents, and accomplished the present invention.

The present invention provides the following Items 1 to 22.

1. A process for producing a fluorinated ionomer, comprising copolymerizing, in the presence of a polymerization initiator, (i) a compound represented by Formula (I)

wherein M is H or a metal with a valence of L (L is 1, 2 or 3), X is F, Cl or $CF_3$, Y is a halogen atom, m is 1 to 5, and n is 0 to 5, (ii) tetrafluoroethylene and (iii) at least one third monomer selected from the group consisting of hexafluoropropylene, chlorotrifluoroethylene, vinylidene fluoride, perfluoroalkyl vinyl ether ($CF_2$=CFORf wherein Rf is $C_1$ to $C_5$ perfluoroalkyl) and ethylene (the process being hereinafter referred to as the first invention).

2. A process for producing a fluorinated ionomer block copolymer, comprising the steps of: copolymerizing, in the presence of a polymerization initiator and an iodine compound, (i) a compound represented by Formula (I)

wherein M is H or a metal with a valence of L (L is 1, 2 or 3), X is F, Cl or $CF_3$, Y is a halogen atom, m is 1 to 5, and n is 0 to 5, (ii) tetrafluoroethylene and (iii) at least one third monomer selected from the group consisting of hexafluoropropylene, chlorotrifluoroethylene, vinylidene fluoride, perfluoroalkyl vinyl ether ($CF_2$=CFORf wherein Rf is $C_1$ to $C_5$ perfluoroalkyl) and ethylene, to form a fluorine-containing polymer chain segment B containing sulfonic acid groups; and reacting, in the presence of a polymerization initiator, the fluorine-containing polymer chain segment B, tetrafluoroethylene and at least one third monomer selected from the group consisting of hexafluoropropylene, chlorotrifluoroethylene, vinylidene fluoride, perfluoroalkyl vinyl ether ($CF_2$=CFORf wherein Rf is $C_1$ to $C_5$ perfluoroalkyl) and ethylene, to form a fluorine-containing polymer chain segment A which is different from the fluorine-containing polymer chain segment B.

3. A process according to Item 1 or 2, wherein the third monomer is hexafluoropropylene and/or perfluoroalkyl vinyl ether ($CF_2$=CFORf wherein Rf is $C_1$ to $C_5$ perfluoroalkyl).

4. A method for collecting an unreacted residue of a compound represented by Formula (I)

wherein M is H or a metal with a valence of L (L is 1, 2 or 3), X is F, Cl or CF3, Y is a halogen atom, m is 1 to 5 and n is 0 to 5, and removing a low-molecular-weight ionic impurity, the method comprising subjecting a solution or dispersion of a fluorinated ionomer or fluorinated ionomer block copolymer obtained by the process according to Item 1 or 2 to ultrafiltration or dialysis.

5. A method for purifying and concentrating a fluorinated ionomer, comprising subjecting a fluorinated ionomer solution or dispersion to ultrafiltration or dialysis (the method being hereinafter referred to as the second invention).

6. A method according to Item 5, wherein the fluorinated ionomer solution or dispersion contains a fluorinated ionomer obtained by copolymerizing a compound represented by Formula (I)

wherein M is H or a metal with a valence of L (L is 1, 2 or 3), X is F, Cl or $CF_3$, Y is a halogen atom, m is 1 to 5, and n is 0 to 5, with a fluoroolefin or fluoroolefins.

7. A method according to Item 5, wherein the fluorinated ionomer solution or dispersion contains a fluorinated ionomer block copolymer comprising a fluorine-containing polymer chain segment B obtained by copolymerizing a compound represented by Formula (I)

wherein M is H or a metal with a valence of L (L is 1, 2 or 3), X is F, Cl or $CF_3$, Y is a halogen atom, m is 1 to 5, and n is 0 to 5, with a fluoroolefin or fluoroolefins; and a fluorine-containing polymer chain segment A which is obtained by copolymerization using the fluoroolefin or fluoroolefins and which is different from the fluorine-containing polymer chain segment B.

8. A method according to Item 6 or 7, wherein the fluoroolefin or fluoroolefins are at least two members selected from the group consisting of tetrafluoroethylene, trifluoroethylene, vinylidene fluoride, hexafluoropropylene, perfluoroalkyl vinyl ether ($CF_2$=CFORf wherein Rf is $C_1$ to $C_5$ perfluoroalkyl) and chlorotrifluoroethylene.

9. A method according to Item 6 or 7, wherein the fluorinated ionomer solution or dispersion contains a fluorinated ionomer of fluorinated ionomer block copolymer obtained by further using ethylene in the copolymerization.

10. A method for forming a film of a fluorinated ionomer, comprising casting on a substrate a concentrated fluorinated ionomer solution or dispersion obtained by the method according to Item 5.

11. A method according to Item 10, wherein a cation affinity substance is added as a film-forming aid in the film formation by casting of the concentrated fluorinated ionomer solution or dispersion on a substrate.

12. A method according to Item 11, wherein the fluorinated ionomer is a copolymer of a compound of the Formula (I)

wherein M is H or a metal with a valence of L (L is 1, 2 or 3), X is F, Cl or $CF_3$, Y is a halogen atom, m is 1 to 5, and n is 0 to 5, with a fluoroolefin or fluoroolefins.

13. A method according to Item 11, wherein the fluorinated ionomer is a fluorinated ionomer block copolymer comprising a fluorine-containing polymer chain segment B obtained by copolymerizing a compound represented by Formula (I)

wherein M is H or a metal with a valence of L (L is 1, 2 or 3), X is F, Cl or $CF_3$, Y is a halogen atom, m is 1 to 5, and n is 0 to 5, with a fluoroolefin or fluoroolefins, and a fluorine-containing polymer chain segment A which is obtained by copolymerization using the fluoroolefin or fluoroolefins and which is different from the fluorine-containing polymer chain segment B.

14. A method according to Item 12 or 13, wherein the fluoroolefin or fluoroolefins are at least two members selected from the group consisting of tetrafluoroethylene, trifluoroethylene, vinylidene fluoride, hexafluoropropylene, perfluoroalkyl vinyl ether ($CF_2$=CFORf wherein Rf is $C_1$ to $C_5$ perfluoroalkyl) and chlorotrifluoroethylene.

15. A method according to Item 11, wherein the cation affinity substance is polyethylene glycol.

16. A process for producing a sulfonic acid functional group-containing fluorinated ionomer comprising 1 to 50 mole % of repeating units derived from a monomer represented by Formula (I)

wherein M is H or a metal with a valence of L (L is 1, 2 or 3), X is F, Cl or $CF_3$, Y is a halogen atom, m is 1 to 5, and n is 0 to 5 (a sulfonic acid functional group-containing perhalogenated monomer); 50 to 99 mole % of repeating units derived from tetrafluoroethylene; and 0 to 10 mole % of repeating units derived from a monomer or monomers copolymerizable therewith (a third monomer or monomers); the process comprising carrying out solution polymerization or suspension polymerization in any of the polymerization media (1) to (4):

(1) an organic solvent capable of dissolving a sulfonic acid functional group-containing perhalogenated monomer at a concentration of 0.005 mole/L or higher (hereinafter referred to as Solvent A);

(2) a mixed solvent comprising a solvent incompatible with Solvent A (Solvent B) and Solvent A;

(3) an acid capable of dissolving a sulfonic acid functional group-containing perhalogenated monomer at a concentration of 0.005 mole/L or higher (Solvent D);

(4) a mixed solvent comprising a solvent incompatible with Solvent D (Solvent E) and Solvent D (the process being hereinafter referred to as the third invention).

17. A process according to Item 16, wherein the polymerization medium is a mixed solvent obtained by adding another solvent compatible with Solvent A (Solvent C) to Solvent A or the mixed solvent comprising Solvent A and Solvent B.

18. A process according to Item 16, wherein the polymerization medium is a mixed solvent obtained by adding another solvent compatible with Solvent D (Solvent F) to Solvent D or the mixed solvent comprising Solvent D and Solvent E.

19. A process according to Item 16, wherein m is 1, n is 0 to 5, X is $CF_3$ and Y is F.

20. A process according to Item 19, wherein n is 0.

21. A method according to Item 15, wherein M is H or Na.

22. A method according to Item 15, wherein Solvent A is an organic solvent having a dielectric constant of 6 to 60.

The starting compound of Formula (I) used in the first to third inventions is known, and can be prepared by, for example, the methods disclosed in U.S. Pat. No. 3,560,568 and WO98/43952, pamphlet. Specifically, the compound can be prepared by pyrolyzing a corresponding starting material according to the following scheme:

wherein M is H or a metal with a valence of L (L is 1, 2 or 3), X is F, Cl or $CF_3$, Y is a halogen atom, m is 1 to 5, and n is 0 to 5.

Preferably, the monomer represented by Formula (I) (hereinafter referred to as "S monomer") is a monomer represented by Formula (1):

wherein M' is an alkali metal or an alkaline earth metal, m' is an integer of 1 to 4, and n' is 0, 1 or 2.

In S monomer of Formula (I) for use in the first to third inventions, M may be hydrogen, a monovalent metal such as an alkali metal (e.g., Na, Li, K or Cs) or the like, a divalent metal such as an alkaline earth metal (e.g., Mg or Ca) or the like, or a trivalent metal such as Al or the like. Preferably, M is hydrogen or sodium. Usually, salts of polyvalent metals reduce solubility, but the sulfonic acid functional group-containing perhalogenated monomer for use in the invention is an extremely strong acid and therefore the solubility is not impaired even if M is a polyvalent metal.

Suitable as X is F, Cl or $CF_3$.

Suitable as Y is a halogen atom (F, Cl, Br or I).

m is preferably 1 to 5, more preferably 1 to 3, in particular 1.

n is preferably 0 to 5, more preferably 0 to 3, further more preferably 0 or 1, especially 0.

I. First Invention

In the ionomer according to the invention, the ratio of S monomer of Formula (I), tetrafluoroethylene (TFE) and at least one third monomer selected from the group consisting of hexafluoropropylene, chlorotrifluoroethylene, vinylidene fluoride, perfluoroalkyl vinyl ether ($CF_2$=CFORf wherein Rf is $C_1$ to $C_5$ perfluoroalkyl) and ethylene, is S monomer: TFE: third monomer=5 to 49 mole %: 94 to 50 mole %: 0.5 to 20 mole %. It is preferable to use the minimum necessary amount of the third monomer relative to TFE, in order to stabilize the polymer solution or polymer dispersion to be formed.

In the process of the invention, the fluorinated ionomer can be easily produced by copolymerization in the presence of a radical initiation source. The process is also capable of producing a fluorinated ionomer block copolymer by copolymerization in the presence of an iodine compound. The iodine transfer polymerization method using an iodine compound is known per se (see "Kobunshi Ronbunshu" (Collected Papers on Polymers), Vol. 49, No. 10 (1992), 765-783.

Examples of usable iodine compounds include 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane and other perfluoroalkylene diiodides, perfluoroalkenyl iodides having an unsaturated bond, such as $CF_2$=CFI, $CF_2$=$CFOCF_2CF_2I$ or the like, diiodomethane, 1,2-diiodoethane, and the like. These compounds may be used singly or in combination. Among them, 1,4-diiodoperfluorobutane is preferable. The amount of the diiodine compound is 0.01 to 1 wt. % based on the total weight of the monomers.

The polymerization initiator for use in the process of the invention may be an initiator heretofore used in polymerization for producing a fluorinated ionomer. Such initiators include organic and inorganic peroxides and azo compounds. Typical initiators include persulfates, carbonate peroxides, ester peroxides and the like. As a preferred initiator, ammonium persulfate (APS) can be mentioned. APS may be used singly, or in combination with a reducing agent such as a sulfite, a sulfite, perfluoro-alkylsulfinic acid salt or the like. The amount of the polymerization initiator is 0.01 to 1 wt. % based on the total weight of the monomers.

When producing a block copolymer, the reaction consists of at least two steps.

The production process of a block copolymer will be described referring to Steps 1) to 4) in Example 1 given hereinafter.

In Step 1) in Example 1, a seed of the copolymer to be produced by the invention is prepared. It is presumed that this step gives a micelle-form solution (or sol), or a micelle-form dispersion in some cases, which comprises low-molecular-weight fine polymer particles having iodine bonded at the ends of the polymer chain (I-A-I). The fine particles formed in this step are subjected to the following Steps 2) to 3). Steps 2) and 3) are slightly different from each other in the amount of S monomer to be used, but basically, each of these steps prepares a polymer chain segment —B— containing the maximum possible amount of S monomer. The polymer formed has the structure I—B-A-B—I. Preparation of as many fine polymer particles (I-A-I) as possible prevents the reduction in polymerization rate caused in Step 2) and Step 3) (which are the same steps for increasing the molecular weight of the segment —B—in I—B-A-B—I and the S monomer content in the whole polymer). After increasing the molecular weight of the whole polymer molecule (I—B-A-B—I), Step 4) is carried out. In this step, the polymer is diluted three-fold to reduce the S monomer concentration to a degree similar to that in Step 1), and a water-insoluble crystallizable polymer chain segment -A'- having a similar composition as the segment obtained in Step 1) is formed, to thereby give a block copolymer having the structure I-A'-B-A-B-A'-I. Although the segment -A- in Step 1) has nearly the same composition as the segment -A'-, the segment -A- may be water-soluble in some cases, owing to its low molecular weight.

Generally, the molecular weight of the polymer chain segment A is about 5000 to 1,000,000, and can be adjusted by the ratio of the polymer yield to the amount of the iodine compound used. The weight ratio of the polymer chain segment B to the polymer chain segments A and A' combined can be selected in the range from (98:2) to (5:95), preferably from (95:5) to (40:60). The molecular weight of the block copolymer as a whole is about 5000 to about 3,000,000.

The copolymer or block copolymer is obtained as a stable aqueous dispersion, and can be easily freed of unreacted starting materials such as S monomer, and low-molecular-weight ionic impurities (for example, the polymerization initiator and its decomposition products) by ultrafiltration or other methods.

The ionomer of the invention can be obtained by copolymerizing S monomer, tetrafluoroethylene and at least one third monomer at a specific ratio. The ionomer may be a block or graft copolymer comprising two or more blocks, in which a segment with a high S monomer content and segments with gradually decreasing S monomer contents are linked with one another. The graft copolymer can be obtained when $CF_2$=$CFCF_2CF_2I$ or the like is employed as the iodine compound.

The ionomer produced by the process of the invention imparts advantageous and specific properties such as selective ion permeability, stereospecificity, etc., when applied to an ion-exchange membrane, a sensor, a permselective membrane, a catalyst, a solid electrolyte, a fuel cell comprising a solid electrolyte, or the like.

II. Second Invention

The fluorinated ionomer solution or dispersion to be subjected to the purification and concentration method of the invention may be, for example, a reaction solution of a homopolymer of a fluoromonomer containing ionic groups such as sulfonic acid groups, carboxyl groups or the like, or a copolymer or block copolymer of such a fluoromonomer with other fluoroolefin(s).

A sulfonic acid group-containing fluorinated ionomer is preferable since it is stable because of the electric repulsion between sulfonic acid ions, and has coagulation resistance.

A preferable fluorinated ionomer is one obtained by copolymerizing a compound represented by Formula (I)

$$(M)_{1/L}OSO_2CFY(CF_2)_mO(CFXCF_2O)_nCF=CF_2 \quad (I)$$

wherein M is H or a metal with a valence of L (L is 1, 2 or 3), X is F, Cl or $CF_3$, Y is a halogen atom, m is 1 to 5, and n is 0 to 5, (hereinafter referred to as S monomer), with a fluoroolefin or fluoroolefins. In particular, a fluorinated ionomer obtained according to the first invention is preferable.

The ratio of S monomer and fluoroolefin(s) is not limited, but is preferably S monomer:fluoroolefin(s) =5 to 50 mole %:95 to 5 mole %.

Examples of fluoroolefins include tetrafluoroethylene, trifluoroethylene, vinylidene fluoride, hexafluoropropylene, perfluoroalkyl vinyl ether ($CF_2$=CFORf wherein Rf is a $C_1$ to $C_5$ perfluoroalkyl) and chlorotrifluoroethylene. A copolymer containing at least two of these fluoroolefins is preferable since such a copolymer has high coagulation resistance. The fluorinated ionomer may be a copolymer further containing ethylene.

Preferably, the fluorinated ionomer is a block copolymer comprising a segment B having a high content of the compound of Formula (I) and a segment A having a low content of the compound of Formula (I) or consisting solely of fluoroolefin(s). This block copolymer can be produced by copolymerization in the presence of an iodine compound. The iodine transfer polymerization method using an iodine compound is known per se (see, for example, "Kobunshi Ronbunshu" (Collected Papers on Polymers), Vol. 49, No. 10 (1992), 765-783).

Ultrafiltration can be carried out using an ultrafiltration membrane having a pore diameter of about 20 to 500 nm. Cells of Centriprep (trademark of Amicon) can be used for testing. Further, dialysis can be performed using a collodion membrane or a cellophane membrane. It is also possible to carry out electrodialysis using an ion exchange membrane.

The film formation method of the invention may comprise, for example, adding a necessary amount of a cation affinity substance as a film-forming aid to the fluorinated ionomer solution or dispersion obtained by the above purification and concentration method, followed by casting on a substrate such as glass.

Basically, it is preferable that the cation affinity substance be likely to undergo chain depolymerization when pyrolyzed, and start to decompose at a temperature not higher than 350° C. The molecular weight of the cation affinity substance is suitably about 300 to 1000, although depending on its decomposition behavior. Specific examples include polyethylene glycol, polypropylene glycol, their derivatives such as esters, their block copolymers, carboxymethylcellulose, polyamine, specific species of polyamide acid derivatives, polyacrylic acid, polyvinyl alcohol and the like. The amount of the cation affinity substance to be added is 1 to 30 parts by weight per 100 parts by weight of the fluorinated ionomer.

III. Third invention

The ion exchange membrane, which is the end use of the fluorinated ionomer obtained according to the invention, preferably contains the highest possible concentration of sulfonic acid functional groups. Further, m and n are required to be as small as possible in the range that does not impair the performance. Therefore, a compound in which m is 1 and n is 0 or 1 is used preferably. More preferably, a compound in which n is 0 is used.

The proportion of repeating units derived from the sulfonic acid functional group-containing perhalogenated monomer is 1 to 50 mole %, preferably 5 to 40 mole %.

The proportion of repeating units derived from tetrafluoroethylene is 50 to 99 mole %, preferably 55 to 95 mole %.

The proportion of repeating units derived from the third monomer(s) is 0 to 20 mole %, especially 0 to 10 mole %, preferably 0 to 5 mole %, more preferably 0.5 to 5 mole %.

When a surfactant is added to increase the amount of tetrafluoroethylene dissolved, as in U.S. Pat. No. 3,560,568, an ionomer of S monomer and tetrafluoroethylene for use in the invention is scarcely obtained, but a homopolymer of tetrafluoroethylene is produced.

Solvent A for use in the invention may be an organic solvent capable of dissolving S monomer at a concentration of at least 0.005 mole/L, preferably at least 0.01 mole/L. More desirably, Solvent A is an organic solvent that is highly capable of dissolving both S monomer and tetrafluoroethylene and has a dielectric constant of 6 to 60. The dielectric constant is preferably 6 to 60, more preferably 6 to 40.

Specifically, solvents usable as Solvent A include alcohols such as ethanol, methanol, n-propanol, iso-propanol, n-butanol, sec-butanol, t-butanol, hexafluoroisopropanol and the like; chain ethers having two or more ether linkages, such as dimethoxyethane, diglyme and the like; cyclic ethers such as dioxane, tetrahydrofuran and the like; ketones such as acetone, methyl ethyl ketone and the like; esters such as ethyl acetate, butyl acetate and the like; and pyridine, dimethylformamide, dimethylsulfoxide and the like.

Solvent B is not limited, and may be a solvent incompatible with Solvent A. Specifically, it is desirable that the solubility of Solvent A in Solvent B be not greater than 10 mass %.

Solvent C is not limited, either, but preferably has a solubility of at least 20 mass % in Solvent A.

Each of Solvents B and C is not necessarily made of a single component, and may be a mixture of two or more solvents. It is also possible to use water as a component of Solvent B or C.

The boiling points and freezing points of Solvents A, B and C are not limited, but it is desirable that these solvents be liquids or supercritical fluids at the polymerization temperature and polymerization pressure mentioned later.

When the polymerization medium is a mixture of Solvents A and B, the ratio of Solvent A:Solvent B is preferably 90:10 to 10:90 by mass %.

When the polymerization medium is a mixture of Solvents A and C, the ratio of Solvent A:Solvent C is preferably 90:10 to 10:90 by mass %.

When the polymerization medium is a mixture of Solvents A, B and C, it is preferable that the ratio of Solvent A:Solvent C be 90:10 to 10:90 by mass %, and the ratio of (Solvent A+Solvent C):Solvent B be 90:10 to 12:88 by mass %, and Solvent A/(Solvent A+Solvent B+Solvent C) be at least 10 mass %.

Acids usable as Solvent D in the invention include ordinary organic acids such as acetic acid, trifluoroacetic acid, $CF_2$=$CFCF_2COOH$ and the like; compounds which exhibit acidity owing to the effects of electron withdrawing substituents, such as phenol, hexafluoroisopropanol and the like; inorganic acids such as hydrofluoric acid and the like; etc. Among them, trifluoroacetic acid is particularly preferred.

Solvent E is not limited, and may be a solvent incompatible with Solvent A. Specifically, it is preferable that the solubility of Solvent D in Solvent E be not greater than 10 mass %.

Solvent F is not limited, either, but preferably has a solubility of at least 20 mass % in Solvent D.

Each of Solvents E and F is not necessarily made of a single component, and may be a mixture of two or more solvents. It is also possible to use water as a component of Solvent E or F.

When the polymerization medium is a mixture of Solvents D and E, the ratio of Solvent D:Solvent E is preferably 90:10 to 10:90 by mass %.

When the polymerization medium is a mixture of Solvents D and F, the ratio of Solvent D:Solvent F is preferably 90:10 to 10:90 by mass %.

When the polymerization medium is a mixture of Solvents D, E and F, it is preferable that the ratio of Solvent D:Solvent F be 90:10 to 10:90 by mass %, and the ratio of (Solvent D+Solvent F):Solvent E be 90:10 to 12:88 by mass %, and Solvent D/(Solvent D+Solvent E+Solvent F) be at least 10 mass %.

The polymerization can be carried out by a known technique for solution polymerization or suspension polymerization.

Usable polymerization initiators are not limited and include known initiators such as peroxides, redox initiators, iodine compounds, azo compounds, ultraviolet rays, ionizing radiations and the like. These initiators can be used in combination. The amount of the polymerization initiator to be used is 0.001 to 5 mole % based on the total of the monomers.

A surfactant, an acid acceptor or the like can be added as required.

The polymerization pressure is not limited, but is preferably selected in the range of 0.1 to 20 MPa, according to the purposes such as control of the ionomer molecular weight, or control of the polymerization rate.

The polymerization temperature is not limited, but is preferably selected in the range of −20° C. to 200° C., according to the decomposition temperature of the polymerization initiator used and the melting point of the polymerization medium used.

The ionomer produced by the process of the invention can be used as a chemical sensor, a separation membrane, a polymeric superacid catalyst, a proton-conducting polyelectrolyte of a fuel cell, or the like.

When used as a proton-conducting polyelectrolyte of a fuel cell, the ionomer preferably has an EW (molecular weight per functional group) of 800 to 2000, or not higher than 800.

The composition of the polymer for preparing the electrolyte membrane is: 1 to 50 mole % of repeating units derived from a sulfonic acid functional group-containing perhalogenated monomer; 50 to 99 mole % of repeating units derived from tetrafluoroethylene; and 0 to 10 mole % of repeating units derived from a monomer or monomers (third monomer(s)) copolymerizable therewith. Usually, the composition of the polymer can be controlled by the concentration of the sulfonic acid functional group-containing perhalogenated monomer in the solution at the time of polymerization, the polymerization pressure, the polymerization temperature, the selection of the third monomer(s) or the like.

To increase the strength of the polyelectrolyte membrane, it is advantageous that the ionomer have a suitable molecular weight, i.e., 2,000 to 3,000,000.

The molecular weight can be measured by a known method. For example, when the ionomer is soluble in a solvent, the molecular weight can be measured by the limiting viscosity, gel permeation chromatography or like method. When the ionomer is insoluble in solvents because of the composition of the polymer or the like, the molecular weight can be measured by, for example, quantitating the end groups using IR.

The molecular weight can be controlled by the concentration of the polymerization initiator, the polymerization pressure, the polymerization temperature, addition of a chain transfer agent or like method. In particular, for preparing an ionomer with a high molecular weight, it is suitable to use a solvent with low chain-transfer properties (a non-telogenic solvent). Preferred examples of such solvents include t-butanol, butyl acetate and the like.

In order to impart various functions to the ionomer, it is desirable to add third monomer(s) in a range that does not impair the basic performance as a polyelectrolyte membrane. The third monomer(s) can be suitably selected from copolymerizable monomers, according to the purposes such as control of the polymerization rate, control of the composition of the polymer, control of the elastic modulus or other mechanical properties of the ionomer, introduction of a crosslinking site, etc. Examples of usable monomers include hexafluoropropylene, vinylidene fluoride, chlorotrifluoroethylene, vinyl ethers, $CF_2=CFI$, $CF_2=CF-O-(CF(CF_3)CF_2)_nCF_2CF_2I$ and other iodine-containing monomers; divinylbenzene and like monomers having at least two unsaturated bonds; cyano-containing monomers; and the like.

According to the first invention, a sulfonic acid group-containing fluorinated ionomer useful as a strong acid fluorine polyelectrolyte can be easily obtained in a purifiable form. In particular, the fluorinated ionomer block copolymer is capable of increasing the mechanical strength of a molded body, since its polymer molecule includes a crystalline, fluorine-containing polymer chain segment which eventually contains sulfonic acid groups, and the crystalline segment binds the polymer molecule as a whole.

According to the second invention, purification, concentration and film formation of a fluorinated ionomer can be easily performed.

According to the third invention, a fluorinated ionomer can be produced by an industrially easy method, the fluorinated ionomer comprising 1 to 50 mole % of repeating units derived from a sulfonic acid functional group-containing perhalogenated monomer; 50 to 99 mole % of repeating units derived from tetrafluoroethylene; and 0 to 10 mole % of repeating units derived from third monomer(s).

BEST MODE FOR CARRYING OUT THE INVENTION

The following Examples and Comparative Examples are provided to illustrate the invention in further detail.

REFERENCE EXAMPLE 1A

A 1 L flask equipped with an agitating element, a thermometer, a nitrogen gas ($N_2$ gas) inlet and a reflux condenser tube was charged with 300 g of $Cl(CF_2CFCl)_3Cl$ which had been freshly purified by distillation, and 4 g of dehydrated diglyme. While introducing dry $N_2$ gas at a rate of 50 ml/min and stirring, 240 g of $NaOCOCF(CF_3)OCF_2CF_2SO_3Na$ in a powder form which had been heated and dehydrated at 130° C. for 2 hours was placed into the flask quickly and carefully so as to avoid absorption of moisture. Immediately thereafter, heating was started using a heating mantle. After 20 minutes, the temperature reached 200° C. and reflux started. After a further 5 minutes, there was observed a rapid increase in the amount of gas emitted from the top of the reflux condenser tube. After continuing the reaction for about 20 minutes and when almost no generation of gas was observed, the heating mantle was turned off. The flask was then quenched in an ice bath for 5 minutes to room temperature. The reaction temperature was a maximum of 207° C.

A brown granular powder dispersed in $Cl(CF_2CFCl)_3Cl$ was filtrated through a glass filter, washed with a small amount of HCFC225 and air-dried, to thereby obtain a slightly colored granular powder. Then, the granular powder was dissolved in 200 ml of pure water. The resulting solution was adjusted to pH 7 with a 10% aqueous NaOH solution, and filtered again to collect the filtrate. The white residue on the filter was NaF. The filtrate was placed in an evaporator to evaporate the water content. When the whole filtrate turned to a mostly wet solid, the solid was kept cool in a refrigerator at 5° C. for 1 hour. Then, the solid was placed on a glass filter and filtered under reduced pressure in a room temperature atmosphere for about 2 hours. A brown liquid gradually oozed out, and a white crystalline powder remained on the filter. The white crystalline powder was recrystallized from water, giving the objective $CF_2=CFOCF_2CF_2SO_3Na$ (S monomer).

EXAMPLE 1A

1) A 5 L pressure reaction vessel made of stainless steel and equipped with a thermometer sleeve and a gas inlet tube was charged with 2 L of pure water, 0.1 g of ammonium persulfate (APS), 60 g of S monomer obtained in Reference Example 1 and 0.6 g of 1,4-diiodoperfluorobutane. With stirring, the inner space of the reaction vessel was purged with hexafluoropropylene (HFP) by repeating slight pressurization and vacuumization. Subsequently, the inner space was pressurized to 0.3 MPa with hexafluoropropylene gas and then to 1 MPa with tetrafluoroethylene (TFE), and heated to 60° C. After 30 minutes, the pressure reached 1.15 MPas, and immediately thereafter, began to drop. Accordingly, after a pressure drop of 0.1 MPa, the temperature was lowered to 20° C. or less and the pressure was released, to temporarily stop the polymerization reaction. The product was a transparent dispersion. This step is so-called "seed polymerization" which aims mainly to obtain nuclei of a stable dispersion.

2) S monomer (80 g) and APS (0.05 g) were added to the dispersion formed in Step 1). After adjusting pH to 7.5, a polymerization reaction was initiated in the same manner as in Step 1). Immediately after the temperature rose to 60° C., the pressure started to drop. Thus, when the pressure decreased by 0.16 MPa after 8 hours, the polymerization was terminated. As a result, a colorless transparent dispersion was obtained, like in Step 1).

3) Subsequent to Step 2), S monomer (50 g) and APS (0.1 g) were added. The same polymerization procedure as Step 2) was repeated twice, and after 16 hours, the polymerization was terminated, giving 2160 g of a colorless transparent dispersion. This dispersion was very stable and did not coagulate even when an electrolyte solution such as hydrochloric acid or a potash alum solution was added. Thus, a part of the dispersion was subjected to evaporation of the water content and thoroughly dried, and unreacted S monomer was dissolved and collected from the dry residue using acetone. The polymer yield and the S monomer content in the polymer were calculated from the material balance, and found to be 157 g and 25.7 mole %, respectively.

4) The dispersion obtained in Step 3) (330 g) was diluted three-fold with pure water, followed by addition of 0.1 g of APS. The resulting mixture was placed in the same reaction vessel as used in Step 1) to 3). After purging with HFP gas in a similar manner, the inner space of the reaction vessel was pressurized to 0.45 MPa and then to 0.9 MPa with TFE gas, and heated to 60° C. Immediately thereafter, the pressure started to drop. After 4 hours, when the pressure decreased by 0.06 MPa, the temperature was lowered to 20° C. and the pressure was released, to stop the polymerization reaction. The product was a transparent dispersion with slight turbidity.

Figure 1:
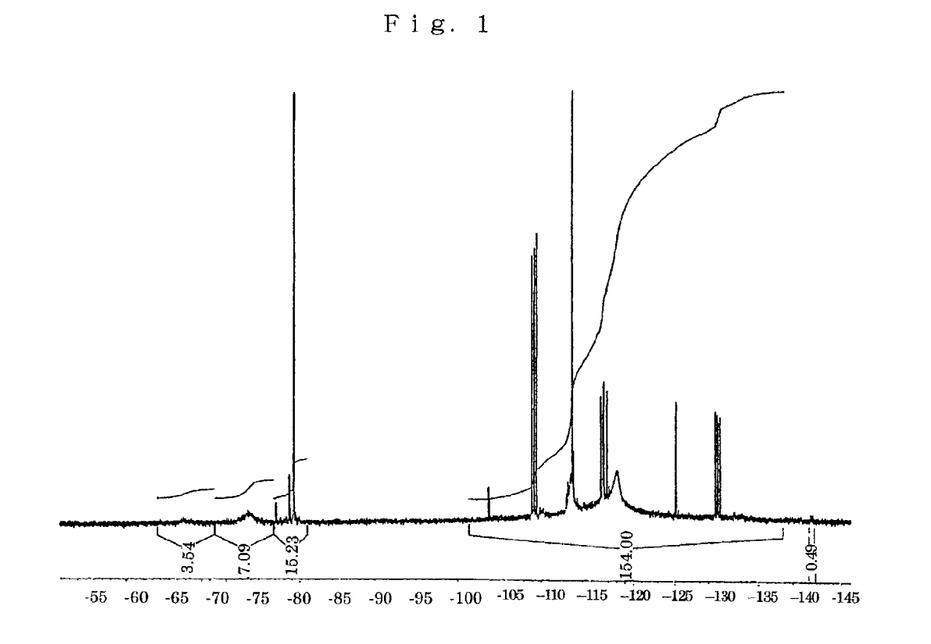
FIG. 1 shows $^{19}F$-NMR of the dispersion obtained in Example 1A.
Figure 2:
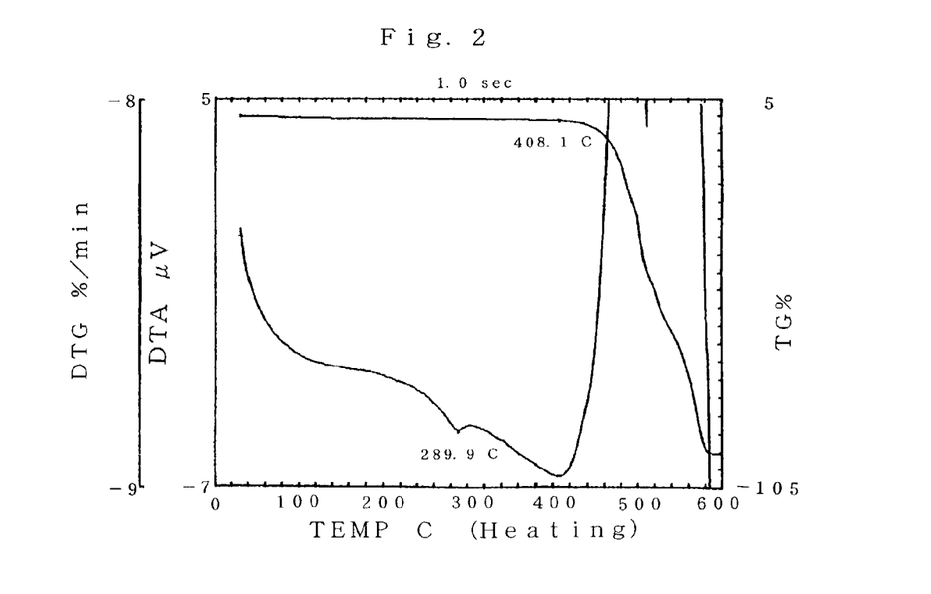
FIG. 2 shows the results of the differential thermogravimetric analysis (DTGA) of the dispersion obtained in Example 1A.

A part of the dispersion was evaporated to dryness, and the residue was subjected to extraction with acetone to collect S monomer. As a result, it was found that the polymer yield and the S monomer content in the polymer were 81 g and 7.8 mole %, respectively. Presumably, this polymer was a block copolymer. FIG. 1 shows $^{19}$F-NMR of the obtained dispersion. FIG. 2 shows the results of differential thermogravimetric analysis (DTGA) of the dispersion. $^{19}$F-NMR spectrum could be obtained even from the dispersion. Further, it was revealed that the polymer of the invention, which contains $SO_3Na$ groups as functional groups, has good heat stability.

COMPARATIVE EXAMPLE 1A

A copolymer of TFE and S monomer was obtained by following the procedure of Example 1A except that HFP was not used as a comonomer. The obtained binary copolymer was liable to coagulate during the prolonged polymerization, owing to the instability of the dispersion formed. Further, because of the instability of the binary copolymer dispersion, the copolymer was likely to precipitate in the course of purification by ultrafiltration or dialysis, making it difficult to eliminate unreacted S monomer and concentrate the copolymer by ultrafiltration or dialysis.

EXAMPLE 2A

The dispersions formed in Steps 1) to 4) in Example 1A were very stable, so that unreacted residual S monomer can be collected by ultrafiltration. The dispersions formed in Steps 3) and 4) in Example 1 were placed individually in cells of Centriprep (trademark of Amicon). When the dispersions were treated under centrifugation conditions of room temperature and 1500 G, only S monomer penetrated the ultrafiltration membrane. Further, the dispersions were added to the cells, and the treatment was repeated several times. Thereafter, the same procedure was continued while adding pure water. As a result, S monomer was removed almost completely, and concentrated dispersions with a polymer concentration of 60% was obtained.

EXAMPLE 1B

1) A 500 ml pressure reaction vessel made of stainless steel and equipped with a thermometer sleeve and a gas inlet tube was charged with 200 ml of pure water, 0.04 g of ammonium persulfate (APS), 6 g of S monomer obtained in Reference Example 1A and 0.06 g of 1,4-diiodo-perfluorobutane. With stirring, the inner space of the reaction vessel was purged with hexafluoropropylene (HFP) by repeating slight pressurization and vacuumization, pressurized to 0.3 MPa with hexafluoropropylene gas and then to 1 MPa with tetrafluoroethylene (TFE), and heated to 60° C. After 30 minutes, the pressure reached 1.15 Mpas, and immediately thereafter, began to drop. Thus, after a pressure drop of 0.1 MPa, the temperature was lowered to 20° C. or less and the pressure was released, to temporarily stop the polymerization reaction. The product was a transparent dispersion. This step is so-called "seed polymerization" which aims mainly to obtain nuclei of a stable dispersion.

2) S monomer (8 g) and APS (0.01 g) were added to the dispersion formed in Step 1). After adjusting pH to 7.5, a polymerization reaction was initiated in the same manner as in Step 1). Immediately after the temperature rose to 60° C., the pressure started to drop. Thus, when the pressure decreased by 0.16 MPa after 8 hours, the polymerization was terminated. As a result, a colorless transparent dispersion was obtained, like in Step 1).

3) Subsequent to Step 2), S monomer (5 g) and APS (0.01 g) were added, the same polymerization procedure as Step 2) was repeated twice, and after 16 hours, the polymerization was terminated. As a result, 216 g of a colorless transparent dispersion was obtained. This dispersion was very stable and did not coagulate even when an electrolyte solution such as hydrochloric acid or a potash alum solution was added. Thus, a part of the dispersion was subjected to evaporation of the water content and thoroughly dried, and unreacted S monomer was dissolved and collected from the dry residue using acetone. The polymer yield and the S monomer content in the polymer were calculated from the material balance and found to be 15.7 g and 25.7 mole %, respectively.

4) The dispersion obtained in Step 3) (33 g) was diluted three-fold with pure water, followed by addition of 0.02 g of APS. The resulting mixture was placed in the same reaction vessel as used in Steps 1) to 3). After purging with HFP gas in a similar manner, the inner space of the reaction vessel was pressurized to 0.45 MPa and then to 0.9 MPa with TFE gas, and heated to 60° C. Immediately thereafter, the pressure started to drop. After 4 hours, when the pressure decreased by 0.06 MPa, the temperature was lowered to 20° C. and the pressure was released, to terminate the polymerization reaction. The product was a transparent dispersion with slight turbidity.

The dispersions formed in Step 3) and 4) were placed individually in cells of Centriprep (trademark of Amicon). When the dispersions were treated under centrifugation conditions of room temperature and 1500 G, only S monomer penetrated the ultrafiltration membrane. Further, the dispersions were added to the cells, and the ultrafiltration was repeated several times. Thereafter, the ultrafiltration was continued while adding pure water. As a result, impurities such as S monomer, the polymerization initiator, etc. were removed almost completely, and concentrated dispersions with a polymer concentration of 60% were obtained.

EXAMPLE 2B

The concentrated dispersion with a polymer concentration of 60% obtained by purifying and concentrating, through unltrafiltration, the dispersion obtained in Step 3) in Example 1B was colorless and transparent, and had a viscosity of 85 centipoises. The concentrated dispersion was diluted with pure water to 43%, and polyethylene glycol (molecular weight: 400) was added in a proportion of 15 wt. % with respect to the polymer. The resulting mixture was applied to a glass test plate with a knife coater (20 mils), quickly dried, heated in a 350° C. heating furnace for 2 minutes, and air-cooled to form a 80 μm thick dry film on the glass plate. The obtained film was so tough that it was not broken by bending at an angle of 180°. Moreover, the heat treatment at 350° C. decomposed and evaporated polyethylene glycol, with the result that no polyethylene glycol remained in the obtained film.

The dispersion obtained in Step 4) in Example 1B could be formed into a film in a similar manner.

COMPARATIVE EXAMPLE 1B

The dispersion obtained in Step 3) in Example 1B was formed into a 80 μm thick dry film in the same manner as Example 2, except that polyethylene glycol was not used. During drying, a part of the film cracked.

EXAMPLE 1C (1) Synthesis of $CF_2=CF-O-CF_2CF_2SO_3Na$

The method described in WO98/43952, pamphlet (the same method as Reference Example 1A) was carried out to synthesize $CF_2=CF-O-CF_2CF_2SO_3Na$ (S monomer).

(2) Dissolution Test (Solvent A)

Each solvent shown in the following table (50 cc) was placed in an individual test tube, and a small amount of S monomer was added to test the dissolving power.

The dissolving power was visually evaluated on the following scale of three. Table 1 shows the results. A: Completely dissolved; B: Partially dissolved or swelled; C: Not dissolved.

TABLE 1

| Solvent | Dielectric constant | Dissolving power |
| --- | --- | --- |
| Hexane | 1.88 | C |
| Benzene | 2.28 | C |

TABLE 1-continued

| Solvent | Dielectric constant | Dissolving power |
| --- | --- | --- |
| Carbon disulfide | 2.64 | C |
| Diphenyl ether | 3.69 | C |
| Diethyl ether | 4.34 | C |
| Chloroform | 4.81 | C |
| Ethyl acetate | 6.02 | A |
| Tetrahydrofuran | 7.58 | A |
| Pyridine | 12.4 | A |
| Isopropanol | 12.5 | A |
| Acetone | 20.7 | A |
| Ethanol | 24.6 | A |
| Methanol | 32.7 | A |
| Dimethylformamide | 36.7 | A |
| Acetonitrile | 37.5 | A |
| Trifluoroacetic acid | 39.5 | A |
| Acetic acid | 20.0 | A |

(3) Solubility Test

The solubility of S monomer was measured in some of the solvents which exhibited a high dissolving power in the test (2).

| Solvent | Solubility (mole/L) |
| --- | --- |
| t-Butanol | 0.53 |
| sec-Butanol | 0.77 |
| Dimethoxyethane | 2.7 |

(2) Dissolution test (Solvent D)

Each solvent shown in the following table (50 cc) was placed in an individual test tube, and a small amount of S monomer was added to test the dissolving power.

The dissolving power was visually evaluated on the following scale of three. Table 2 shows the results. A: Completely dissolved; B: Partially dissolved or swelled; C: Not dissolved

TABLE 2

| Acid | Dissolving power | Solubility (mole/L) |
| --- | --- | --- |
| Acetic acid | A | Not measured. |
| Trifluoroacetic acid | A | 0.7 |
| Hexafluoroisopropanol | A | 0.03 |
| Hydrofluoric acid | A | Not measured. |
| $CF_2=CFCF_2COOH$ | A | Not measured. |

(5) Polymerization Example

A 250 mL cylindrical pressure vessel made of stainless steel was charged with 30 g of t-butanol while adjusting the temperature to 30° C. Then, 5 g of S monomer was added and dissolved completely. After adding 0.1 g of a 50% methanol solution of di-normal propyl dicarbonate as a polymerization initiator, the vessel was sealed. Then, a cycle consisting of vacuumization and purging with nitrogen was repeated three times.

Thereafter, tetrafluoroethylene was introduced while raising the temperature to 40° C., and the pressure was stabilized at 0.8 MPa.

The pressure vessel was set in the shaker maintained at 40° C., and a reaction was carried out for 15 hours. As a result, the pressure dropped to 0.4 MPa.

After releasing the remaining tetrafluoroethylene, the content of the vessel was taken out. The content was a viscous, milk-white solution. This solution was dried using an evaporator, and washed with water to remove unreacted S monomer, giving 8 g of a polymer.

NMR analysis revealed that this polymer consisted of 80 mole % of tetrafluoroethylene and 20 mole % of a sulfonic acid functional group-containing perhalogenated monomer.

EXAMPLE 2C

Copolymerization of $CF_2=CF-O-CF_2CF_2SO_3Na$ and TFE

A 100 cc glass autoclave equipped with a stirring mechanism was charged with a solution of 17.2 g of S monomer in 50 ml of trifluoroacetic acid, followed by addition of 0.015 g of Perloyl NPP (manufactured by NOF CORPORATION).

After repeating a cycle consisting of vacuumization and purging with nitrogen three times at room temperature, 5 g of hexafluoropropene was introduced, and the temperature was raised to 60° C.

Subsequently, tetrafluoroethylene was introduced to a gauge pressure of 0.7 MPa to initiate polymerization. The pressure was maintained constant by introducing tetrafluoroethylene, and the polymerization was terminated when the introduced amount reached 5 g.

Then, stirring was discontinued and the pressure of the system was released. Subsequently, trifluoroacetic acid was volatilized and collected under reduced pressure, giving a mixture of an unreacted monomer and a copolymer.

This mixture was poured into water and the insoluble matters were filtered off, followed by washing and drying to thereby obtain 7.2 g of a copolymer.

EXAMPLE 3C

Dissolution of the Copolymer and Film Formation

A 50 ml pressure vessel made of stainless steel was charged with 1 g of the copolymer obtained in Example 2C and 19 g of a water/ethanol mixed solution, and sealed. The temperature in the vessel was raised 250° C. and maintained for 3 hours.

After cooling to room temperature, the solution was filtrated through a membrane filter, giving a solution of the copolymer.

NMR measurement of this solution revealed that the copolymer consisted of 15 mole % of S monomer and 85 mole % of tetrafluoroethylene.

A 10 g portion of the obtained solution was placed in a 50 ml eggplant type flask, followed by addition of 1 g of DMSO. The resulting mixture was heated in a vacuum at 80° C. to remove low boiling components, giving a viscous, slightly yellowed solution.

This solution was applied to a glass plate using an applicator with a 500 µm gap, and dried at 250° C.

Then, the film was peeled off by immersion in water. The obtained film was uniform and strong.

After drying, the thickness of the film was measured and found to be 51 µm.

The film was then immersed in dilute hydrochloric acid, washed with water and dried in a vacuum. The EW of this film was measured by a conventional method and found to be 840.

The invention claimed is:

1. A process for producing a fluorinated ionomer block copolymer, comprising the steps of: copolymerizing, in the presence of a polymerization initiator and an iodine compound, (i) a compound represented by Formula (I)

wherein M is H or a metal with a valence of L wherein L is 1, 2 or 3, X is F, Cl or $CF_3$, Y is a halogen atom, m is 1 to 5, and n is 0 to 5, (ii) tetrafluoroethylene and (iii) at least one third monomer selected from the group consisting of hexafluoropropylene and perfluoroalkyl vinyl ether of structure $CF_2=CFORf$ wherein Rf is $C_1$ to $C_5$ perfluoroalkyl, to form a fluorine-containing polymer chain segment B containing sulfonic acid groups; and reacting, in the presence of a polymerization initiator, the fluorine-containing polymer chain segment B, tetrafluoroethylene and at least one third monomer selected from the group consisting of hexafluoropropylene, and perfluoroalkyl vinyl ether of structure $CF_2=CFORf$ wherein Rf is $C_1$ to $C_5$ perfluoroalkyl, to form a fluorine-containing polymer chain segment A which is different from the fluorine-containing polymer chain segment B;
wherein the fluorine-containing polymer chain segment B comprises:
(i) 5 to 49 mole % of repeating units derived from the compound represented by Formula (I),
(ii) 50 to 94 mole % of repeating units derived from tetrafluoroethylene, and
(iii) 0.5 to 20 mole % of repeating units derived from the third monomer(s).

2. The process of claim 1, further comprising the step of:
dissolving or dispersing the product of the reacting step to form a solution or dispersion; and
subjecting the solution or dispersion to ultrafiltration or dialysis.

3. A method for purifying and concentrating the fluorinated ionomer obtained according to the method of claim 1, comprising subjecting a fluorinated ionomer solution or dispersion to ultrafiltration or dialysis.

4. A method for forming a film of a fluorinated ionomer, comprising casting on a substrate a concentrated fluorinated ionomer solution or dispersion obtained by the method according to claim 3.

5. A method according to claim 4, wherein a cation affinity substance is added as a film-forming aid in the film formation by casting of the concentrated fluorinated ionomer solution or dispersion on a substrate.

6. A method for forming a film of a fluorinated ionomer, comprising the steps of:
1 copolymerizing, in the presence of a polymerization initiator, (i) a compound represented by Formula (I)

wherein M is H or a metal with a valence of L wherein L is 1, 2 or 3, X is F, Cl or $CF_3$, Y is a halogen atom, m is 1 to 5, and n is 0 to 5, (ii) tetrafluoroethylene and (iii) at least one third monomer selected from the group consisting of hexafluoropropylene and perfluoroalkyl vinyl ether of structure $CF_2=CFORf$ wherein Rf is $C_1$ to $C_5$ perfluoroalkyl, to produce a fluorinated ionomer;
2) subjecting a solution or dispersion of the fluorinated ionomer of step (1) to ultrafiltration or dialysis to produce a concentrated solution or dispersion of the fluorinated ionomer; and
3) casting on a substrate the concentrated solution or dispersion of the fluorinated ionomer, wherein polyethylene glycol is added as a film-forming aid.

7. A process for producing a sulfonic acid functional group-containing fluorinated ionomer comprising 1 to 50 mole % of repeating units derived from a monomer represented by a sulfonic acid functional group-containing perhalogenated monomer of Formula (I)

wherein M is H or a metal with a valence of L wherein L is 1, 2 or 3, X is F, Cl or $CF_3$, Y is a halogen atom, m is 1 to 5, and n is 0 to 5; 50 to 99 mole % of repeating units derived from tetrafluoroethylene; and 0 to 10 mole % of repeating units derived from a third monomer or monomers copolymerizable therewith; the process comprising carrying out solution polymerization or suspension polymerization in any of the polymerization media (1) to (4):

(1) Solvent A, which is an organic solvent capable of dissolving a sulfonic acid functional group-containing perhalogenated monomer at a concentration of 0.005 mole/L or higher;

(2) a mixed solvent comprising Solvent B and Solvent A, wherein Solvent B is a solvent incompatible with Solvent A;

(3) Solvent D, which is an acid capable of dissolving a sulfonic acid functional group-containing perhalogenated monomer at a concentration of 0.005 mole/L or higher;

(4) a mixed solvent comprising Solvent E and Solvent D, wherein Solvent B is a solvent incompatible with Solvent D.

8. A process according to claim 7, wherein the polymerization medium is a mixed solvent obtained by adding Solvent C, which is another solvent compatible with Solvent A, to Solvent A or to the mixed solvent comprising Solvent A and Solvent B.

9. A process according to claim 7, wherein the polymerization medium is a mixed solvent obtained by adding Solvent F, which is another solvent compatible with Solvent D, to Solvent D or to the mixed solvent comprising Solvent D and Solvent E.

10. A process according to claim 7, wherein m is 1, n is 0 to 5, X is $CF_3$ and Y is F.

11. A process according to claim 10, wherein n is 0.

12. A method according to claim 6, wherein M is H or Na.

13. A method according to claim 7, wherein Solvent A is an organic solvent having a dielectric constant of 6 to 60.

14. A method according to claim 6, wherein the fluorinated ionomer comprises:

(i) 5 to 49 mole % of repeating units derived from the compound represented by Formula (I), (ii) 50 to 94 mole % of repeating units derived from tetrafluoroethylene, and (iii) 0.5 to 20 mole % of repeating units derived from the third monomer(s).

15. A method for forming a film of a fluorinated ionomer, comprising the steps of:

1) copolymerizing, in the presence of a polymerization initiator and an iodine compound, (i) a compound represented by Formula (I)

$$(M)_{1/L}OSO_2CFY(CF_2)_mO(CFXCF_2O)_nCF=CF_2 \qquad (I)$$

wherein M is H or a metal with a valence of L wherein L is 1, 2 or 3, X is F, Cl or $CF_3$, Y is a halogen atom, m is 1 to 5, and n is 0 to 5, (ii) tetrafluoroethylene and (iii) at least one third monomer selected from the group consisting of hexafluoropropylene and perfluoroalkyl vinyl ether of structure $CF_2=CFORf$ wherein Rf is $C_1$ to $C_5$ perfluoroalkyl, to form a fluorine-containing polymer chain segment B containing sulfonic acid groups;

2) reacting, in the presence of a polymerization initiator, the fluorine-containing polymer chain segment B, tetrafluoroethylene and at least one third monomer selected from the group consisting of hexafluoropropylene, and perfluoroalkyl vinyl ether of structure $CF_2=CFORf$ wherein Rf is $C_1$ to $C_5$ perfluoroalkyl, to form a fluorine-containing polymer chain segment A which is different from the fluorine-containing polymer chain segment B, thereby yielding a fluorinated ionomer block copolymer;

3) subjecting a solution or dispersion of the fluorinated ionomer block copolymer of step (2) to ultrafiltration or dialysis to produce a concentrated solution or dispersion of the fluorinated ionomer block copolymer; and 4) casting on a substrate the concentrated solution or dispersion of the fluorinated ionomer block copolymer, wherein polyethylene glycol is added as a film-forming aid.

16. A process according to claim 7, wherein the ratio of repeating units derived from the third monomer is 0.5 to 10 mole %.

17. A method according to claim 15, wherein the fluorine-containing polymer chain segment B comprises:

(i) 5 to 49 mole % of repeating units derived from the compound represented by Formula (I), (ii) 50 to 94 mole % of repeating units derived from tetrafluoroethylene, and (iii) 0.5 to 20 mole % of repeating units derived from the third monomer(s).

* * * * *